(12) United States Patent
Cottrille

(10) Patent No.: US 6,831,646 B1
(45) Date of Patent: Dec. 14, 2004

(54) METHOD AND SYSTEM FOR INDICATING THE EXISTENCE OF A CONTROL OBJECT

(75) Inventor: Scott C. Cottrille, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 791 days.

(21) Appl. No.: 09/605,497

(22) Filed: Jun. 28, 2000

Related U.S. Application Data

(63) Continuation of application No. 08/946,686, filed on Oct. 7, 1997, now Pat. No. 6,239,814, which is a continuation of application No. 08/509,767, filed on Aug. 1, 1995, now abandoned.

(51) Int. Cl.[7] .............................................. G06T 11/00
(52) U.S. Cl. ...................................................... 345/473
(58) Field of Search ................................ 345/473, 709, 345/839, 848, 856, 973, 708; 710/105; 709/245, 328

(56) References Cited

U.S. PATENT DOCUMENTS

| 3,934,249 A | 1/1976 | Sanjana ...................... 340/324 |
| 5,592,602 A | 1/1997 | Edmunds et al. ........... 395/174 |
| 5,961,620 A | * 10/1999 | Trent et al. .................. 710/105 |

OTHER PUBLICATIONS

"Introduction to Visual Basic" Application Developers Training Company p224 Aug. 15, 1994.*
"Identifying objects on the screen," *Power Macintosh User's Guide,* p. 36, ©1995 Apple Computer, Inc.
"Using Balloon Help (Macintosh only)," User's Guide for *Microsoft Word: The World's Most Popular Word Processor,* Version 6.0, p. 17, ©1993–1994 Microsoft Corporation.
Judson, Jeremy, "Getting Help," *The Macintosh Bible,* 6th Edition, p. 16, Copyright ©1996 by Peachpit Press.

* cited by examiner

Primary Examiner—Almis R. Jankus
(74) Attorney, Agent, or Firm—Ronald M. Anderson

(57) ABSTRACT

The present invention provides a system and method for indicating the existence of a control object displayed as part of a graphical user interface. The existence of a control object is indicated by displaying one or more images about the control object and changing the state of the images.

In the preferred embodiment, the images are small, non-intrusive sparkles that contrast in color to the surrounding area of the graphical user interface. The sparkles are clustered about a control object in a pair of orbits and change state by moving among a series of concentric rings that radiate outwardly from a focal point of the control object. The preferred focal point is the center of the control object.

16 Claims, 13 Drawing Sheets

METHOD AND SYSTEM FOR INDICATING THE EXISTENCE OF A CONTROL OBJECT

This applications is continuation of Ser. No. 08/946,686 Oct. 7, 1997 now U.S. Pat. No. 6,239,814, which is a continuation of Ser. No. 08/509,767 Aug. 1, 1995 now abandoned.

TECHNICAL FIELD

The present invention relates generally to the manipulation of objects in a computing device, and more particularly to an improved system for, and method of, indicating the existence of a control object displayed as part of a graphical user interface.

BACKGROUND OF THE INVENTION

Computer operating systems frequently employ a graphical user interface to convey information to users via a monitor by various combinations of graphical user interface items, including icons, text, drop-down menus, dialog boxes, and toolbars.

In a graphical user interface, icons typically represent computer objects such as files and folders that can be manipulated by the user. Drop-down menus organize numerous computer operations into major headings and display the headings across the top of a computer screen. Each heading contains a menu that drops down when the heading is selected by an input pointing device to allow access to the operations listed in the drop-down menu. The operations may be tools, controls, commands, macros or procedures. Toolbars comprise a series of buttons, each of which invokes a predefined operation when actuated. Dialog boxes generally convey information to users concerning a particular operation that has been invoked.

A user typically interacts with a graphical user interface by positioning a cursor over a control object in the graphical user interface with a mouse, or other input pointing device, and by actuating, or clicking, a button on the mouse. The cursor is positioned by means of a roller ball on the underside of the mouse, which generates directional commands as the mouse is moved by the user. That mouse movement is then translated by the computer operating system into movement of the cursor on the screen.

In displaying icons, menus, and other tools, a graphical user interface presents the user with the information necessary to operate the computer system. Thus, there is no need for a user to memorize commands and other functions. Furthermore, the icons and other tools of a graphical user interface are displayed as visual metaphors of the operations they represent. As a result, a graphical user interface provides a relatively simple and intuitive means for operating a computer system.

Nevertheless, children and other computer novices, who use computers infrequently or in an educational context, may not intuitively understand the icons and other tools of a graphical user interface. Consequently, they may be unable to use many of the programs available on the market today. Thus, there exists a need for a method and system by which children and other computer novices may intuitively operate programs by means of a graphical user interface.

A method and system of the prior art for making a program more intuitive for children and other computer novices to operate displays control objects as part of the graphical user interface of the program. Actuation of a control object may be used to open a dialog box containing information associated with the visually represented control object. For example, a control object that opens a dialog box containing information about a tree could be visually represented as a tree. A problem with this method, however, is indicating to the user which visual representations of a graphical user interface are control objects.

Various methods have been used in the prior art for indicating a control object displayed as part of a graphical user interface. In one method, the cursor changes shape or color when positioned over a control object. Although this method provides an indication of a control object, it requires a user actively to hunt and seek the control objects of the graphical user interface. For example, to find the control objects of the graphical user interface, the user must move the cursor over each and every visual representation of the graphical user interface and determine over which visual representations the cursor changed. Thus, there exists a need for a method of indicating a control object displayed as part of a graphical user interface.

More recently, a control object displayed as part of a graphical user interface has been indicated by altering the visual representation of the control object. For example, the control object may alternate between several colors or shimmer to attract the user's attention. Although this method affirmatively indicates the existence of a control object, it is time consuming and costly because each control object must be separately framed and individually programmed. Additionally, altering the visual representation of the control objects interferes with the user's viewing of the graphical user interface.

Thus, there exists a need in the art for a standard system for, and method of, indicating control objects displayed as part of a graphical user interface. Furthermore, the method and system should be non-intrusive to viewing of the graphical user interface.

SUMMARY OF THE INVENTION

The present invention provides a better solution to solving the problems in the art described above by providing a method and system for indicating the existence of a control object displayed as part of a graphical user interface. The existence of a control object is indicated by displaying one or more images about the control object and changing the state of those images.

In the preferred embodiment, the images are small, non-intrusive sparkles that contrast in color with the surrounding area of the graphical user interface. The sparkles are clustered about a control object in a pair of orbits. The orbital clusters of sparkles change state by moving among a series of concentric rings radiating from the center of the control object.

Briefly described, the orbital clusters of sparkles move among the concentric rings by expanding and then contracting along the rings in staggered order. A first orbital cluster of sparkles begins at the smallest ring and expands to the largest ring. When the first orbital cluster of sparkles has reached the largest ring, it reverses course and contracts back to the smallest ring, at which time it disappears. Meanwhile, a second orbital cluster of sparkles begins at the smallest ring when the first orbital cluster of sparkles is at the largest ring and expands to the largest ring while the first orbital cluster of sparkles is contracting to the smallest ring. When the second orbital cluster of sparkles has reached the largest ring, it reverses course and contracts back to the smallest ring, at which point it disappears.

As each orbital cluster of sparkles expands toward the largest ring, the sparkles of that orbital cluster rotate in a clockwise direction such that the sparkles swirl about the focal point of the control object. Conversely, the sparkles of the orbital cluster rotate in a counter clockwise direction as the orbital cluster of sparkles contracts toward the smallest ring.

Further features and advantages of the present invention will become apparent upon reviewing the following description of the preferred embodiments of the invention, when taken in conjunction with the drawings and appended claims.

DETAILED DESCRIPTION

Figure 1:
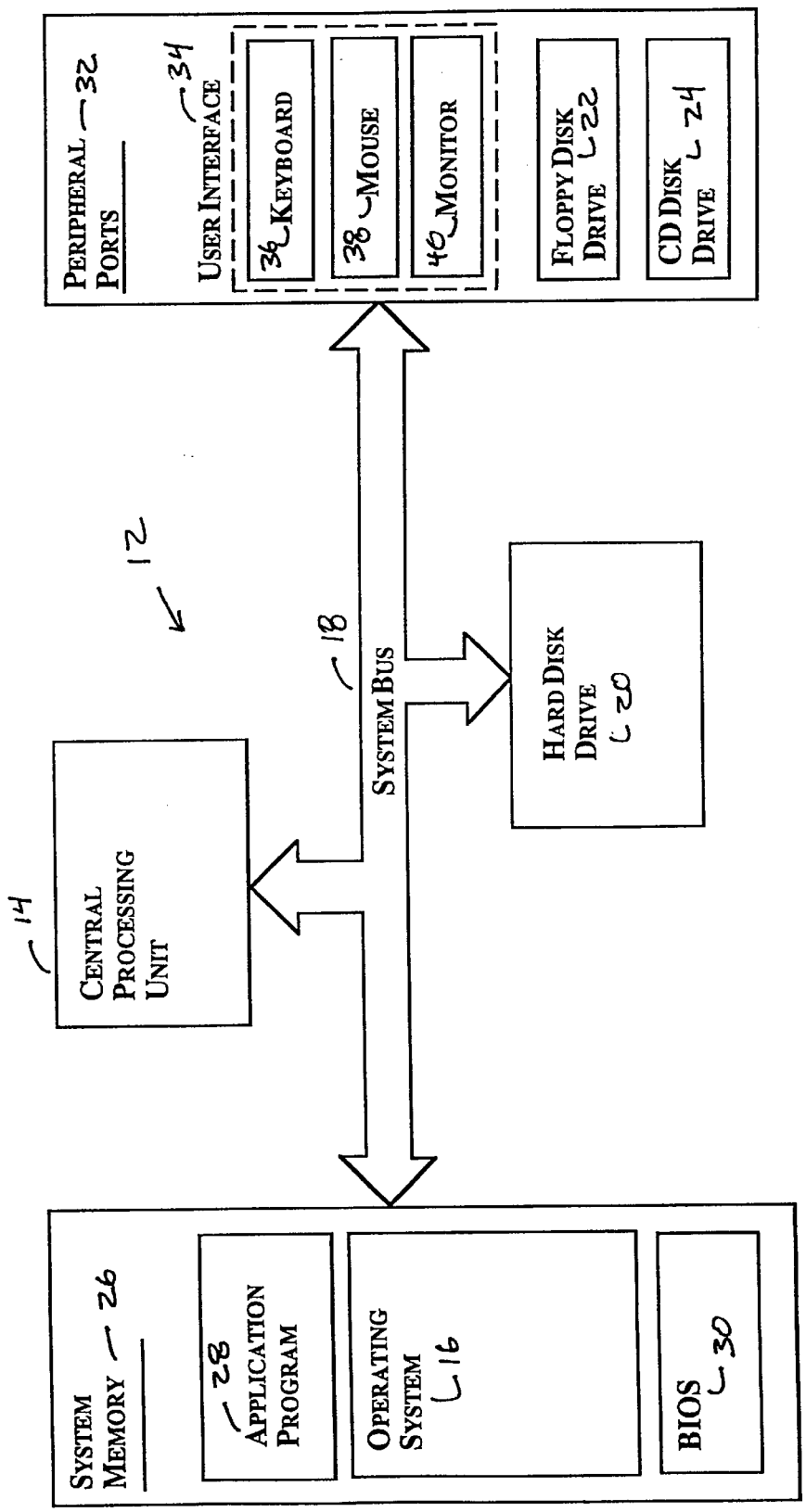
FIG. 1 is a block diagram of the components of a computer system used in connection with the preferred embodiment of the present invention for indicating the existence of a control object displayed as part of a graphical user interface.

Turning first to the nomenclature of the specification, the detailed description which follows is represented largely in terms of processes and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to convey most effectively teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no involvement of a human operator is necessary or even desirable in the present invention. The operations described herein are machine operations performed in conjunction with a human operator or user that interacts with the computer. The machines used for performing the operation of the present invention, as will be understood, include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Referring now to the drawings, in which like numerals refer to like parts throughout the several views, FIG. 1 shows the components of the preferred operating environment, a computer system 12. The computer system 12 comprises a central processing unit (CPU) 14 that operates the computer system 12 in conjunction with a graphical user interface-based operating system 16 to retrieve, process, store, and display data.

The CPU 14 is typically implemented as a microprocessor, such as the models 80386 or 80486 manufactured by Intel Corporation, Santa Clara, Calif. The CPU 14 communicates, by means of control, address, and data signals, with the operating system 16 and with the remaining components of the computer system 12 through a system bus 18.

The operating system 16 comprises a set of computer programs that control the internal functions of the computer system 12 thereby allowing the computer 12 to run application software. The operating system 16 is installed in a mass storage device, such as a hard disk drive 20, a floppy disk drive 22, a CD disk drive 24, or a ROM chip (not shown). During boot up (initialization) of the computer system 12, the operating system 16 is loaded into a system memory 26.

A computer-implemented application program 28 is also loaded into the system memory 26 from the hard disk drive 20, the floppy disk drive 22, or the CD disk drive 24. The application program 28 operates in conjunction with the operating system 16 to provide a graphical user interface.

A basic input/output system (BIOS) program 30 is stored in the system memory 26 along with the operating system 16. The BIOS program 30 supplies the device-level control or support services for the primary input/output devices of the computer during the boot process. After a boot, the BIOS program 30 accepts requests from the application program 28 and from the operating system 16 running on the computer system 12 and performs input/output services as requested by those programs. The functions and operations of conventional BIOS programs are well known and will not be further described herein.

A series of peripheral ports 32 are provided on the system bus 18 for receiving and transmitting data via a user interface 34. The user interface 34 includes a keyboard 36 and an input device for entering data. As used herein, the phrase "input device" means a mouse, trackball, track pad, or any other pointing device for positioning a cursor on a computer screen. In the preferred embodiment, the input device is a mouse 38. Data is graphically displayed by a monitor 40.

The mouse 38 operates in conjunction with a cursor displayed on the monitor 40. The cursor is positioned by means of a roller ball on the underside of the mouse 38, which generates directional commands as the mouse 38 is moved by the user. That mouse movement is then translated by the operating system 16 into movement of the cursor on the monitor 40. As is well known in the art, a user can select, launch, and move objects by moving and clicking the mouse 38.

In the preferred embodiment, the operating system 16 is the "WINDOWS" operating system manufactured by the assignee in this application, Microsoft Corporation of Redmond, Washington. Those skilled in the art will understand that the invention can be implemented in other graphical user interface operating systems, such as the "OS/2" operating system manufactured by IBM and the "MACINTOSH" operating system manufactured by Apple Computer, Inc.

The preferred application program 28 is the "MICROSOFT EXPLORAPEDIA" program manufactured by Microsoft Corporation. As will be understood by those skilled in the art, this invention is equally applicable to other application programs that operate in a graphical user interface environment.

Figure 2:
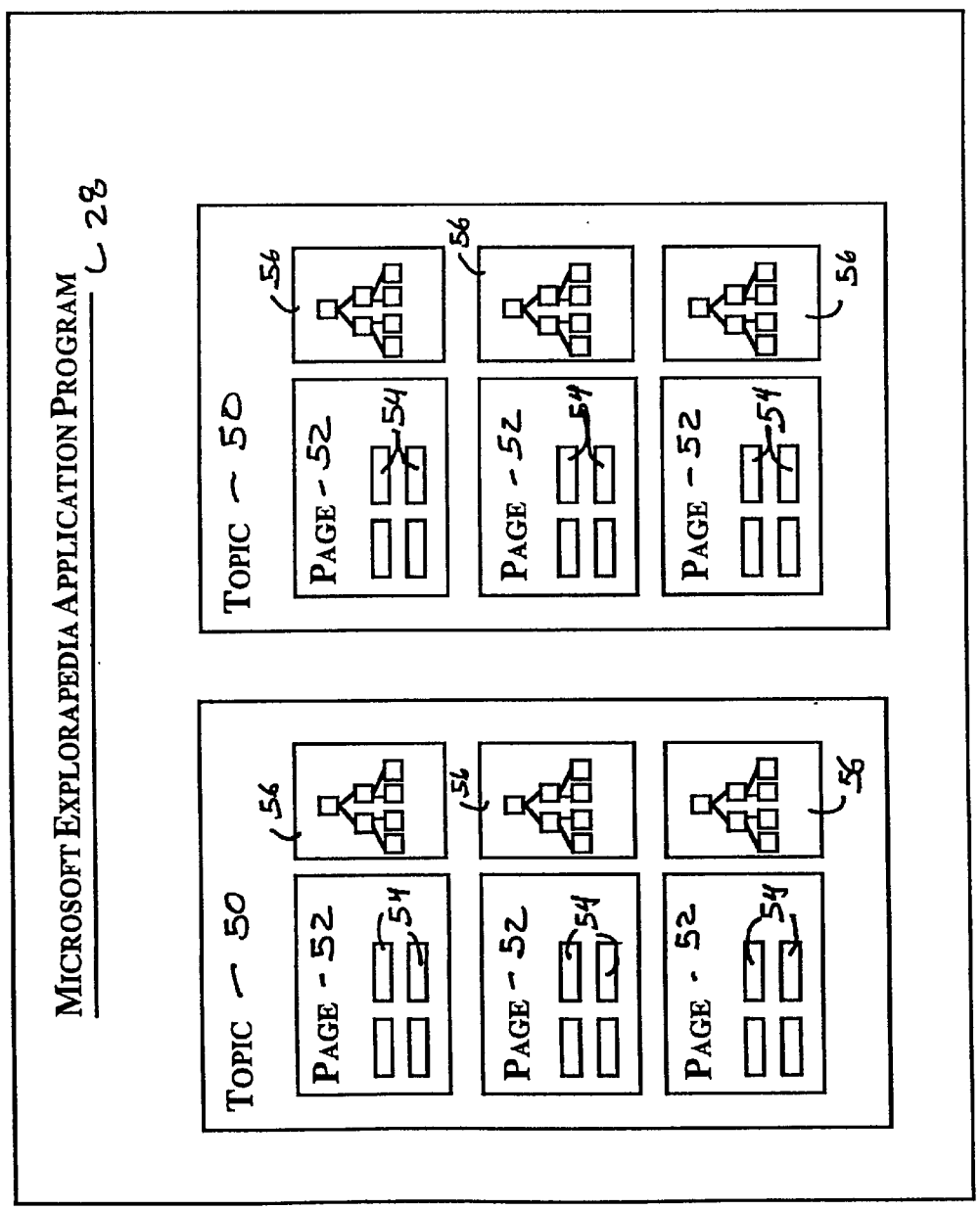
FIG. 2 is a block diagram of the components of a preferred application program for the present invention for indicating the existence of a control object displayed as part of a graphical user interface.

The "MICROSOFT EXPLORAPEDIA" application program 28 is an interactive encyclopedia for the "WINDOWS" operating system. As best shown by FIG. 2, the "MICROSOFT EXPLORAPEDIA" application program 28 is organized by topics 50. Each topic 50 includes a plurality of pages 52 for display on the monitor 40. For example, a nature topic may include page displays for habitats of a coniferous forest, a grassland, a lake, a rain forest, and the like.

Each page 52 includes one or more control objects 54 bound to predefined operations. As used herein, the term "control object" means a visual representation that can be manipulated by a user to perform an operation. Continuing the example from above, a coniferous forest page display of a nature topic may include control objects visually represented as a rabbit, a raccoon, a squirrel, and similar objects. In the preferred "MICROSOFT EXPLORAPEDIA" application program, the control objects open dialog boxes containing additional information about the visually represented object. Thus, actuation of a control object represented as a rabbit would cause a dialog box containing information about rabbits to be opened.

As discussed below, control objects are distinguished from other visual representations of a page 52 by displaying one or more images about the control objects and changing the state of the images to attract attention to the control objects. Thus, a user is informed of the visual representations that are control objects.

The preferred "MICROSOFT EXPLORAPEDIA" application program also includes a polytree 56 associated with each page 52. The general function and operation of polytrees are well known to those skilled in the computer arts and therefore will not be described herein. Each polytree 56 is associated with a page 52 and stores the location and shape of the control objects 54 of that page 52. Additionally, the polytree 56 stores an ordinal number for the control objects 54 of the page 52 to allow the control objects 54 to be sorted into an array having a predefined order for use in accordance with the preferred embodiment of the present invention.

In the context of the present invention, the primary interaction between the application program 28 and the operating system 16 involves timer and drawing operations. Timers are a resource of the operating system 16 that measure a specific interval in milliseconds. The application program 28 creates a timer and sets its interval by using a set timer function of the operating system 16. At the end of the interval, the operating system 16 sends a time-out message to the application program 28. As discussed below in detail, the time-out messages provide a drive mechanism for the method of the present invention for indicating the existence of a control object displayed as part of a graphical user interface.

The application program 28 conducts drawing operations by using functions of the operating system 16 to set the drawing mode and the pen attributes of the operating system 16. With those resources set, the application program 28 draws images directly to the monitor 40.

Further information regarding the "WINDOWS" operating system and its interaction with application programs is available from a variety of publications, including the Guide to Programming, which is part of the Microsoft Windows Software Development Kit (published by Microsoft), the Win32 Programmer's Reference (published by Microsoft Press), and Programming Windows 3.1 (published by Microsoft Press), all of which are incorporated herein by reference. Additional information regarding the "MICROSOFT EXPLORAPEDIA" application program is available from the documentation distributed with Version 1.1. This documentation is incorporated herein by reference.

Turning now to the method of the present invention, a control object displayed as part of a graphical user interface is indicated. A control object is indicated by displaying one or more images about the control object and changing the state of the images to attract attention to the control object. As used herein, the phrase "change state" means to change from one form, activity, appearance, or place to another.

Figure 3A:
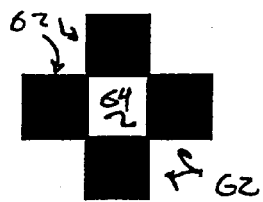
FIG. 3A shows a sparkle of the preferred embodiment of the present invention for indicating the existence of a control object displayed as part of a graphical user interface.

In the preferred embodiment, the images comprise sparkles 60 that are small and non-intrusive. As best shown by FIG. 3A, the sparkles 60 each comprises four contrasting pixels 62 arranged around a center, non-contrasting pixel 64. Accordingly, each sparkle 60 is three pixels in height by three pixels in length and fits within an area of nine square pixels. The size and contrasting color of the sparkles 60 allow them to be visibly distinct from the graphical user interface while not intruding with viewing of the graphical user interface.

Figure 3B:
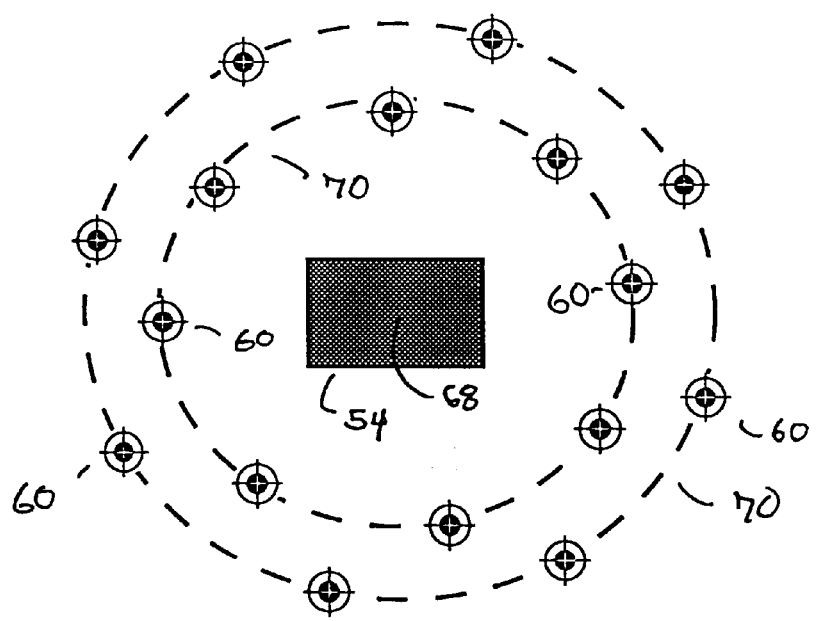
FIG. 3B shows a pair of orbital clusters of sparkles that move around a focal point of a control object in accordance with the preferred embodiment of the present invention.

As best shown by FIG. 3B, the sparkles 60 are clustered about a control object 54 in a pair of orbital clusters 70. The term "about" is used herein to mean in the area or vicinity. In the preferred embodiment, the orbital clusters of sparkles 70 each comprise a circular cluster of eight sparkles 60 around a focal point 68 of the control object 54. As explained below in detail, the preferred focal point 68 is the center of the control object 54.

In the preferred embodiment, the orbital clusters of sparkles 70 move to change state. It will be understood by those skilled in the art, however, that the state of the sparkles 60 may also be changed in accordance with the present invention by altering their appearance through color or shape changes, by altering their form or activity, or the like.

Figure 3C:
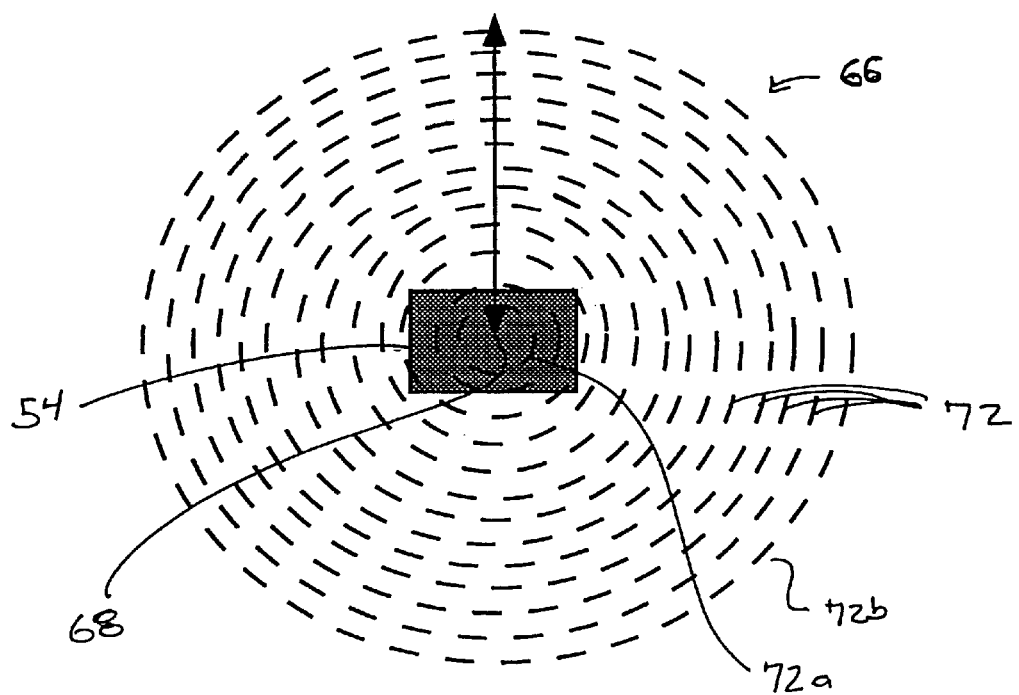
FIG. 3C shows a series of concentric rings radiating from the focal point of the control object in accordance with the preferred embodiment of the present invention.

As best shown by FIG. 3C, the orbital clusters of sparkles 70 change state by moving along a series of concentric rings 66 that radiate outwardly from the focal point 68. The rings may be circular, elliptical or other appropriate shape. The series of concentric rings 66 in FIG. 3C are not displayed on the monitor 40, but merely represent locations along which the orbital clusters of sparkles 70 move and display the sparkles 60.

In the preferred embodiment, the series of concentric rings 66 comprise thirteen successively larger rings 72 in the shape of circles. The smallest ring 72a has a radius of one pixel, with each successively larger ring 72 having a radius incremented by four pixels. Thus, the largest ring 72b has a radius of 49 pixels.

Briefly described, the orbital clusters of sparkles 70 are moved along the series of concentric rings 66 by expanding and then contracting in staggered order. For a cycle, a first orbital cluster of sparkles 70a begins at the smallest ring 72a and expands to the largest ring 72b. When the first orbital cluster of sparkles 70a has reached the largest ring 72b, it reverses course and contracts back to the smallest ring 72a, at which time it disappears. Meanwhile, a second orbital cluster of sparkles 70b begins at the smallest ring 72a when the first orbital cluster of sparkles 70a is at the largest ring 72b and expands to the largest ring 72b while the first orbital cluster of sparkles 70a is contracting to the smallest ring 72a. When the second orbital cluster of sparkles 70b has reached the largest ring 72b, it reverses course and contracts back to the smallest ring 72a, at which time it disappears.

Figure 3D:
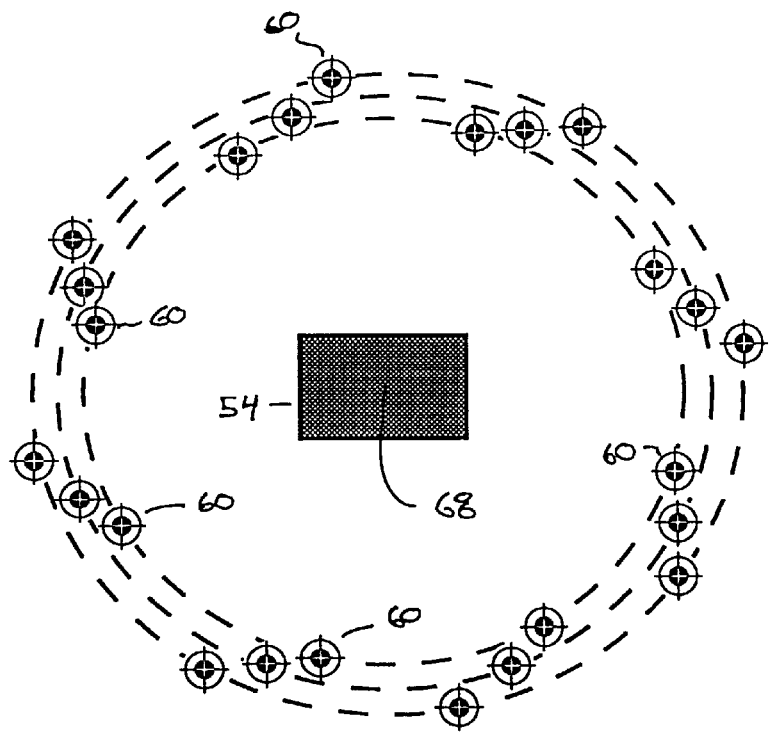
FIG. 3D shows rotation of the orbital clusters of sparkles between the concentric rings of FIG. 3C for indicating the existence of a control object in accordance with the preferred embodiment of the present invention.

As best shown by FIG. 3D, the sparkles 60 in the orbital cluster of sparkles 70 rotate in a clockwise direction as the orbital cluster of sparkles 70 expands toward the largest ring 72b. Conversely, the sparkles 60 rotate in a counter clockwise direction as the orbital cluster of sparkles 70 contracts toward the smallest ring 72a. As a result of this rotation, the sparkles 60 appear to swirl about the control object 54 on the monitor 40.

The location of each of the eight sparkles 60 of a orbital cluster of sparkles 70 is calculated as an offset of the focal point 68 by the following equations, which give the x and y coordinates of a location:

$$x = \sin \phi * r \qquad \text{Equation 1}$$

$$y = \cos \phi * r \qquad \text{Equation 2}$$

In the above equations, "$\phi$" represents a predetermined angle of a sparkle 60 at a particular ring 72 and "r" represents the radius of that ring 72. In the preferred embodiment, $\sin \phi$ and $\cos \phi$ are determined from a sin-cos lookup table. However, those skilled in the computer arts will understand that other means can be employed to determine the sin and cos values. The general function and operation of sin-cos lookup tables are well known to those skilled in the computer arts and therefore will not be described herein.

As shown in the below-illustrated TABLE I, the predetermined polar coordinates of the eight sparkles 60 of an orbital cluster of sparkles 70 are separated by 45 degrees so that the sparkles 60 are evenly distributed around the orbital cluster of sparkles 70. The polar coordinate of each sparkle 60 is decreased by four degrees between the rings 72 during expansion to provide for rotation of the sparkles 60. Conversely, the polar coordinate of each sparkle 60 is increased by four degrees between the rings 72 during contraction to provide for rotation of the sparkles 60 in the opposite direction.

TABLE I

| Sparkle | 1 | 2 | 3 | 4 | 5 | 6 | 7 | 8 |
|---|---|---|---|---|---|---|---|---|
| Ø at r = 1 | 0 | 45 | 90 | 135 | 180 | 225 | 270 | 315 |
| Ø at r = 5 | 356 | 41 | 86 | 131 | 176 | 221 | 266 | 311 |
| Ø at r = 9 | 352 | 37 | 82 | 127 | 172 | 217 | 262 | 307 |
| Ø at r = 13 | 348 | 33 | 78 | 123 | 168 | 213 | 258 | 303 |
| Ø at r = 17 | 344 | 39 | 74 | 119 | 164 | 209 | 254 | 299 |
| Ø at r = 21 | 340 | 35 | 70 | 115 | 160 | 205 | 250 | 295 |
| Ø at r = 25 | 336 | 31 | 66 | 111 | 156 | 201 | 246 | 291 |
| Ø at r = 29 | 332 | 27 | 62 | 107 | 152 | 197 | 242 | 287 |
| Ø at r = 33 | 328 | 23 | 58 | 103 | 148 | 193 | 238 | 283 |
| Ø at r = 37 | 324 | 19 | 54 | 99 | 144 | 189 | 234 | 279 |
| Ø at r = 41 | 320 | 15 | 50 | 95 | 140 | 185 | 230 | 275 |
| Ø at r = 45 | 316 | 11 | 46 | 91 | 136 | 181 | 226 | 271 |
| Ø at r = 49 | 312 | 7 | 42 | 87 | 132 | 177 | 222 | 267 |

Figure 4:
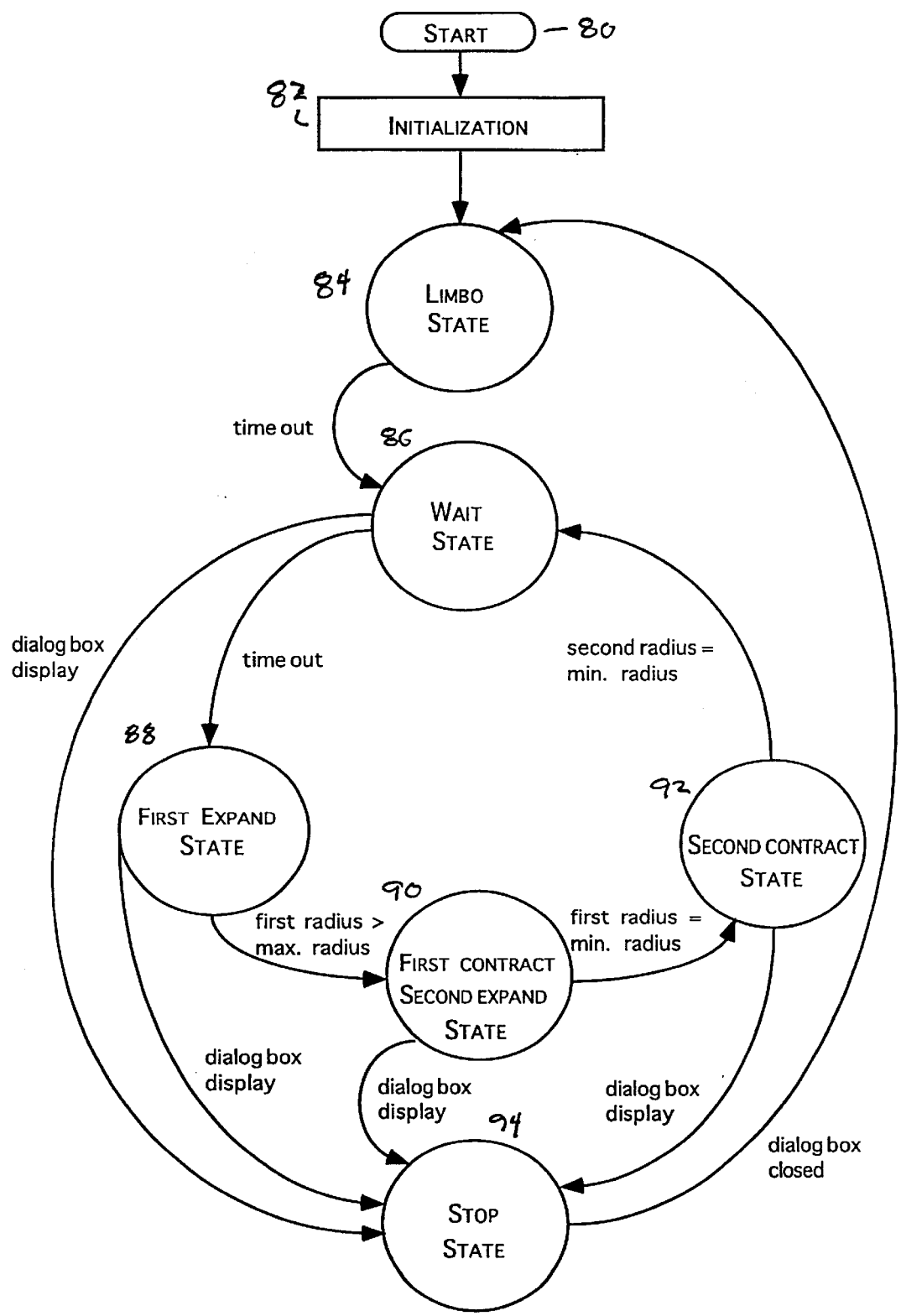
FIG. 4 is a state diagram of the process implemented by an application program for indicating the existence of a control object in accordance with the preferred embodiment of the present invention.

A state diagram of the method for displaying sparkles 60 in a pair of orbital clusters of sparkles 70 around the focal point 68 of a control object 54 in accordance with the preferred embodiment of the present invention is shown by FIG. 4. Screen displays of the process are shown by FIGS. 5A–5F for the "MICROSOFT EXPLORAPEDIA" application program of the preferred embodiment. Details of the processes carried out by the different states are shown by FIGS. 6–12.

As shown by FIG. 4, the method of the present invention begins at step 80 and proceeds to step 82 when a page 52 is displayed on the monitor 40. Those skilled in the art will understand that the method of the present invention can be initiated by other events. For example, when a cursor is positioned over, or in proximity to, a control object 54.

At step 82, the page 52 is initialized to obtain an array of the control objects 54 of the page 52 sorted in predefined order. Step 82 proceeds to a LIMBO state 84. In the LIMBO state 84, as below discussed in connection with FIG. 7, a timer is created and set to one half of a second. The half second timer provides a delay for that period when the page 52 is first displayed before the method moves to the next state.

Upon time-out of the timer, the method of the present invention proceeds to a WAIT state 86. In the WAIT state 84, as below discussed in connection with FIG. 8, the timer set in the LIMBO state is killed, and a new timer is created and set to one tenth of a second. That timer provides a delay between the display and movement of sparkles 60 from one control object 54 to the next and also provides the drive mechanism for moving the orbital clusters of sparkles 70 along the series of concentric rings 66.

Upon time-out of the timer, the process moves to the FIRST EXPAND state 88. In the FIRST EXPAND state 88, as below discussed in connection with FIG. 9, the first orbital cluster of sparkles 70a begins at the smallest ring 72a, as best shown by FIG. 5A, and expands to the largest ring 72b, as best shown by FIG. 5B. When the radius of the first orbital cluster of sparkles 70a is greater than the maximum radius, the first orbital cluster of sparkles 70a has reached the largest ring 72b and the process moves to the FIRST CONTRACT/SECOND EXPAND state 90.

Figure 5C:
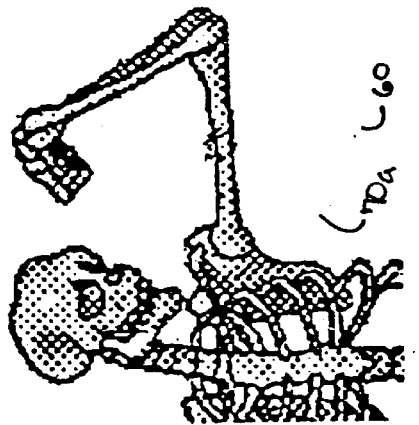
FIGS. 5A–5F are screen displays showing the process for indicating the existence of a control object displayed as part of a graphical user interface in accordance with the preferred embodiment of the present invention from the user's perspective.
Figure 5F:
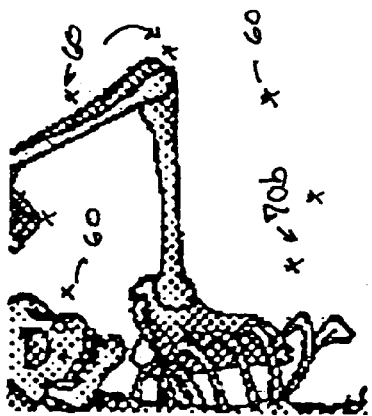
Figure 5B:
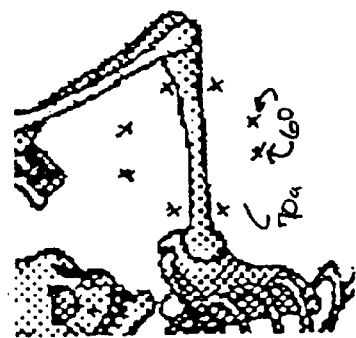
Figure 5E:
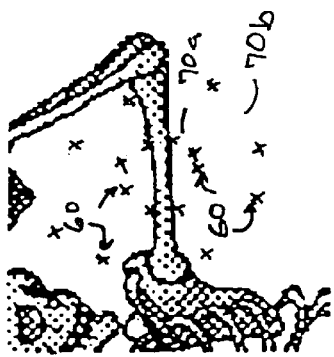
Figure 5A:
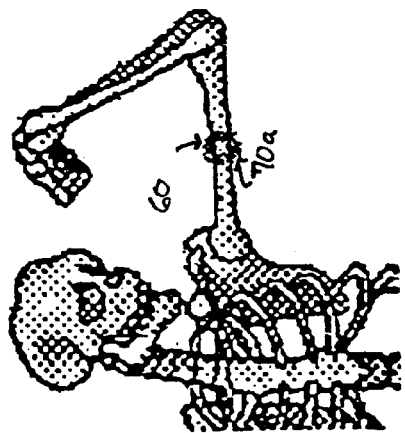
Figure 5D:
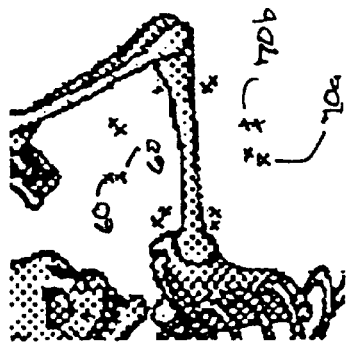

In the FIRST CONTRACT/SECOND EXPAND state 90, as below discussed in connection with FIG. 10, the second orbital cluster of sparkles 70b begins at the smallest ring 72a, as best shown by FIG. 5C, and expands to the largest ring 72b while the first orbital cluster of sparkles 70a contracts back to the smallest ring 72a, as best shown by FIGS. 5D and 5E. When the radius of the first orbital cluster of sparkles 70a is equal to the minimum radius, the first orbital cluster of sparkles 70a has reached the smallest ring 72a and disappears, as best shown by FIG. 5F. The process then moves to the SECOND CONTRACT state 92.

In the SECOND CONTRACT state 92, as below discussed in connection with FIG. 11, the second orbital cluster of sparkles 70b contracts back to the smallest ring 72a. When the radius of the second orbital cluster of sparkles 70b is equal to the minimum radius, the second orbital cluster of sparkles 70b has reached the smallest ring 72a and disappears. The process then moves to the WAIT state 86 to repeat the process for a focal point 68 of a next control object 54.

Figure 12:
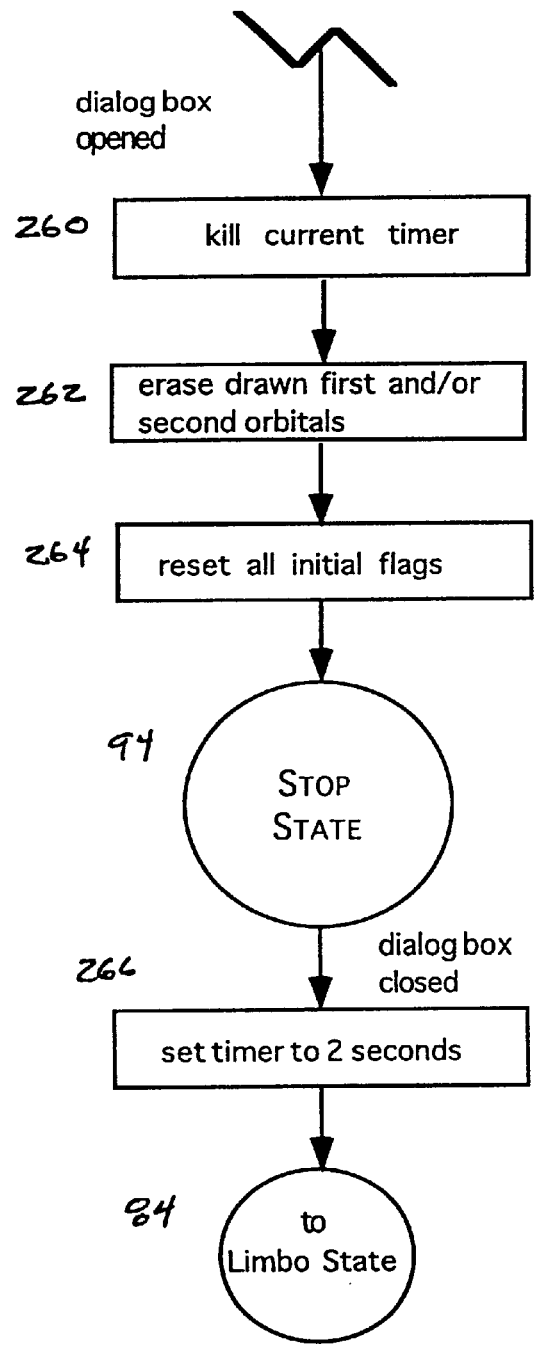
FIG. 12 is a logical flow diagram of the process implemented by the application program in the STOP state of FIG. 4 for indicating the existence of a control object in accordance with the preferred embodiment of the present invention.

If anytime during the process the user causes a dialog box to be displayed by clicking on a control object 54, the process moves to the STOP state 94 wherein, as below discussed in connection with FIG. 12, the process is stopped. When the dialog box is closed by the user, the process then returns to the LIMBO state 84, from where it restarts.

Figure 6:
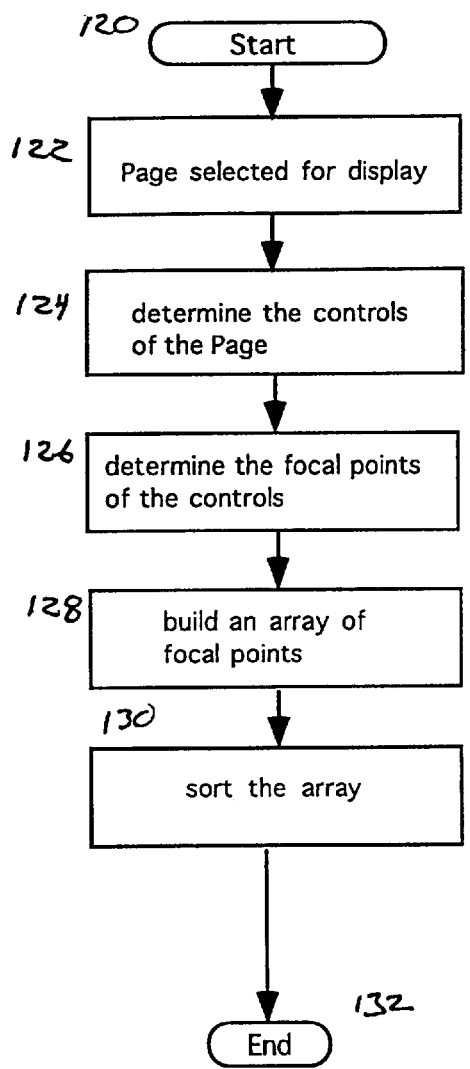
FIG. 6 is a logical flow diagram of the initialization process implemented by the application program of FIG. 4 for indicating the existence of a control object in accordance with the preferred embodiment of the present invention.

Details of the steps carried out by the above states in accordance with the preferred embodiment of the present invention will now be described. As best shown by FIG. 6, the initialization step 82 begins at step 120 and proceeds to step 122. At step 122, a page 52 is selected by the user for display on the monitor 40. In response to the page 52 selection, the control objects 54 of the page 52 are determined at step 124. The control objects 54 are determined by transversing the polytree 56 associated with the page 52 in a recursive manner. Recursive transversing of polytrees is well known to those skilled in the computer arts and therefore will not be described herein.

Next, at step 126, the focal points 68 of the control objects 54 are determined. For control objects 54 in the shape of a circle or a rectangle, the focal point 68 is the center of the control object 54. For irregularly shaped control objects 54, the focal point 68 is any random point inside the control object 54. Step 126 proceeds to step 128 wherein an array of the focal points 68 is built. At step 130, the array is sorted into a predefined order using the ordinal numbers of the control objects 54. Step 130 leads to step 132 wherein the initialization step 82 is ended.

Figure 7:
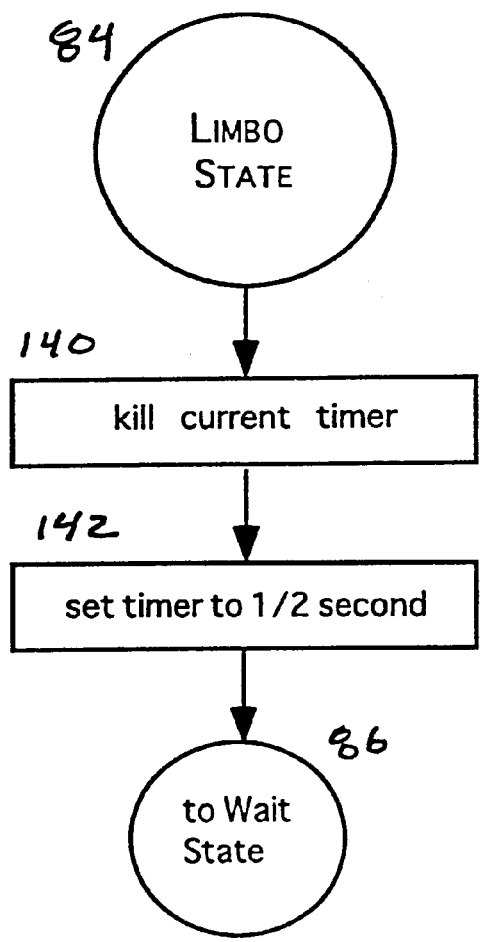
FIG. 7 is a logical flow diagram of the process implemented by the application program in the LIMBO state of FIG. 4 for indicating the existence of a control object in accordance with the preferred embodiment of the present invention.

The initialization step 82 proceeds to the LIMBO state 84. As best shown by FIG. 7, the LIMBO state 84 begins at step 140 wherein any currently running timers are killed. Next, at step 142, a timer is created and its interval set to one half second. Upon time-out of the timer, the LIMBO state 84 moves to the WAIT state 86.

Figure 8:
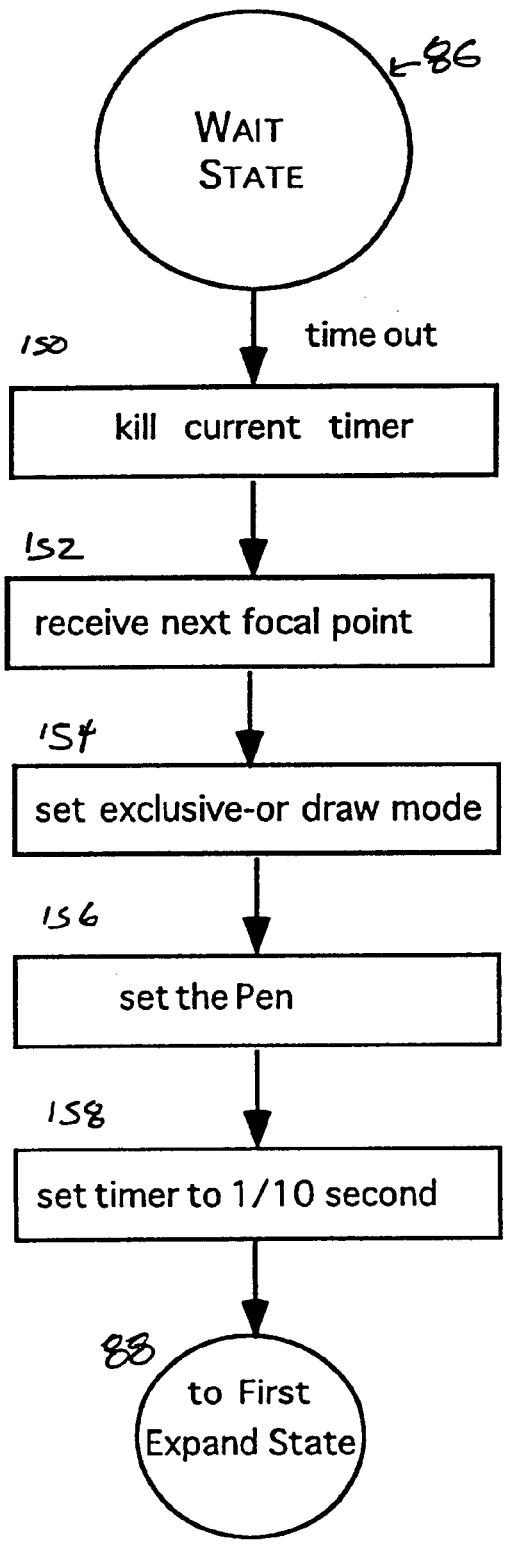
FIG. 8 is a logical flow diagram of the process implemented by the application program in the WAIT state of FIG. 4 for indicating the existence of a control object in accordance with the preferred embodiment of the present invention.

As best shown by FIG. 8, the WAIT state 86 begins at step 150 upon time out of the timer. At step 150, the current timer, which was set in the LIMBO state 84, is killed. Next, at step 152, a focal point 68 of a control object 54 is received. Focal points 68 are received in the predefined order of their control objects 54. The method of the present invention starts with the focal point of the control ordered first in the array, and cycles though the remaining controls according to their order. After finishing with the focal point of the last ordered control, the method starts over with the focal point of the first ordered control.

Proceeding to step 154, an exclusive-or drawing mode is set for the operating system 16. Next, at step 156, a pen function of the operating system 16 is set to white. The combination of the exclusive-or drawing mode and the white pen combine to make the sparkles 60 contrast in color to the surrounding area of the graphical user interface on which they are drawn.

Proceeding to step 158, a timer is created and its interval set to one tenth of a second. Upon time-out of the timer, the WAIT state 86 moves to the FIRST EXPAND state 88.

Figure 9:
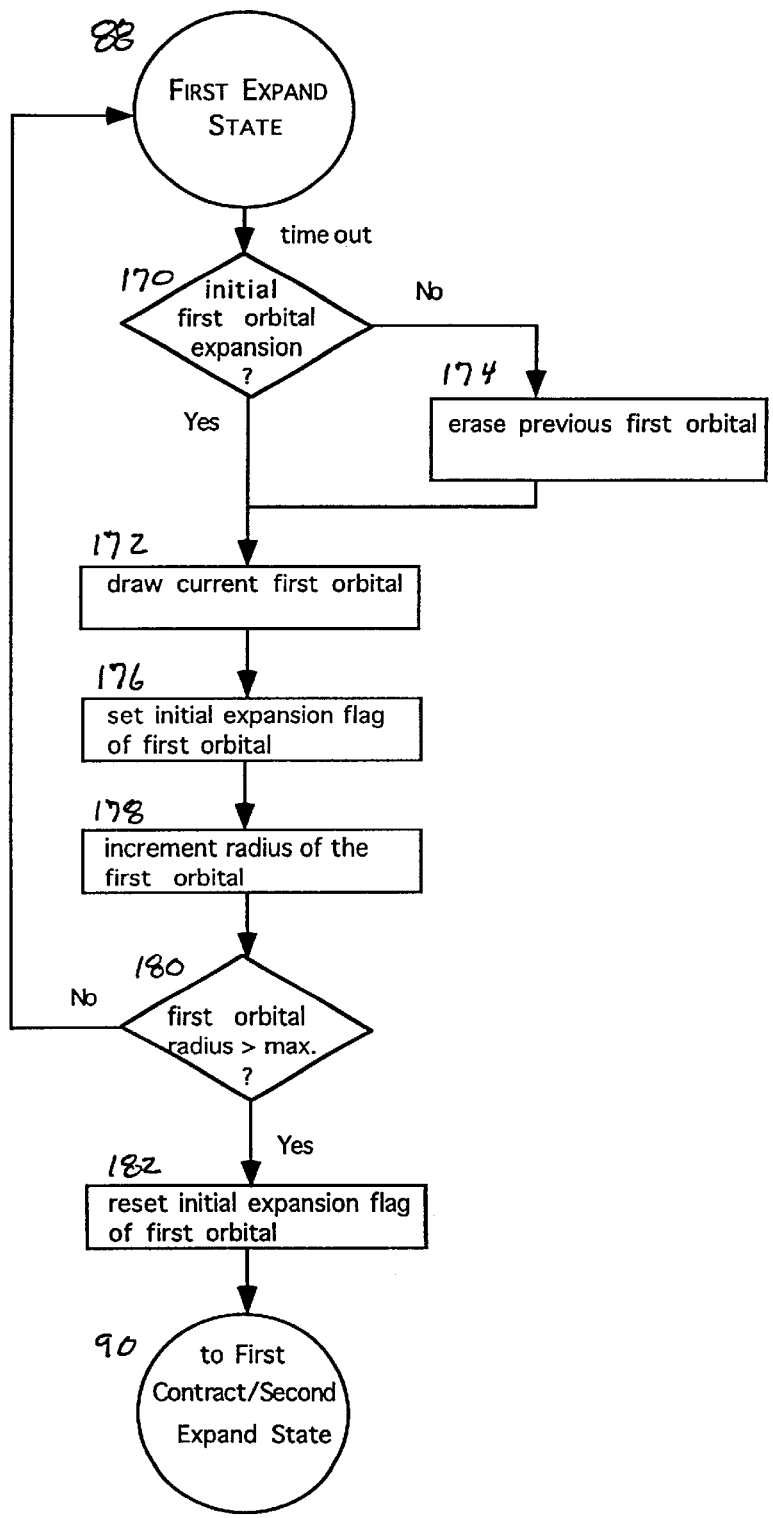
FIG. 9 is a logical flow diagram of the process implemented by the application program in the FIRST EXPAND state of FIG. 4 for indicating the existence of a control object in accordance with the preferred embodiment of the present invention.

As best shown by FIG. 9, the FIRST EXPAND state 88 begins at decisional step 170 upon time out of the timer. At decisional step 170, an initial expansion flag of the first orbital cluster of sparkles 70a is checked to determine if the current first orbital cluster of sparkles 70a is the initial first orbital cluster of sparkles. If the current first orbital cluster of sparkles 70a is the initial first orbital cluster of sparkles, then there is no previous first orbital cluster of sparkles 70a to be erased, and the YES branch of decisional step 170 leads to step 172. If the current first orbital cluster of sparkles 70a is not the initial first orbital cluster of sparkles, the NO branch of decisional step 170 leads to step 174 wherein the previous first orbital cluster of sparkles 70a is erased. Step 174 also leads to step 172.

At step 172, the current first orbital cluster of sparkles 70a is drawn. Step 172 leads to step 176 wherein the initial expansion flag of the first orbital cluster of sparkles is set so that the current first orbital cluster of sparkles 70a will be erased when a next first orbital cluster of sparkles 70a is drawn.

Next, at step 178, the first orbital cluster of sparkles radius is the increment by four pixels so that the next first orbital cluster of sparkles is drawn along the next larger ring 72. Step 178 leads to decisional step 180 wherein it is determined if the radius of the first orbital cluster of sparkles is greater than the maximum radius. In the preferred embodiment the maximum radius is set at 50 pixels.

If the radius of the first orbital cluster of sparkles is not greater than the maximum radius, the first orbital cluster of sparkles 70a has not expanded to the largest ring 72b, and the NO branch of decisional step 180 returns to the FIRST EXPAND state 88 to repeat the process. Thus, the process of the FIRST EXPAND state 88 is repeated until the first orbital cluster of sparkles 70a has expanded to the largest ring 72b.

If the radius of the first orbital cluster of sparkles is greater than the maximum radius, the first orbital cluster of sparkles 70a has expanded to the largest ring 72b, and the YES branch of decisional step 180 leads to step 182. At step 182, the initial expansion flag of the first orbital cluster of sparkles 70a is reset for the next time the process enters the FIRST EXPAND state 88. The process of the FIRST EXPAND state 88 is ended at step 182, and the FIRST EXPAND state 88 moves to the FIRST CONTRACT/SECOND EXPAND state 90.

Figure 10:
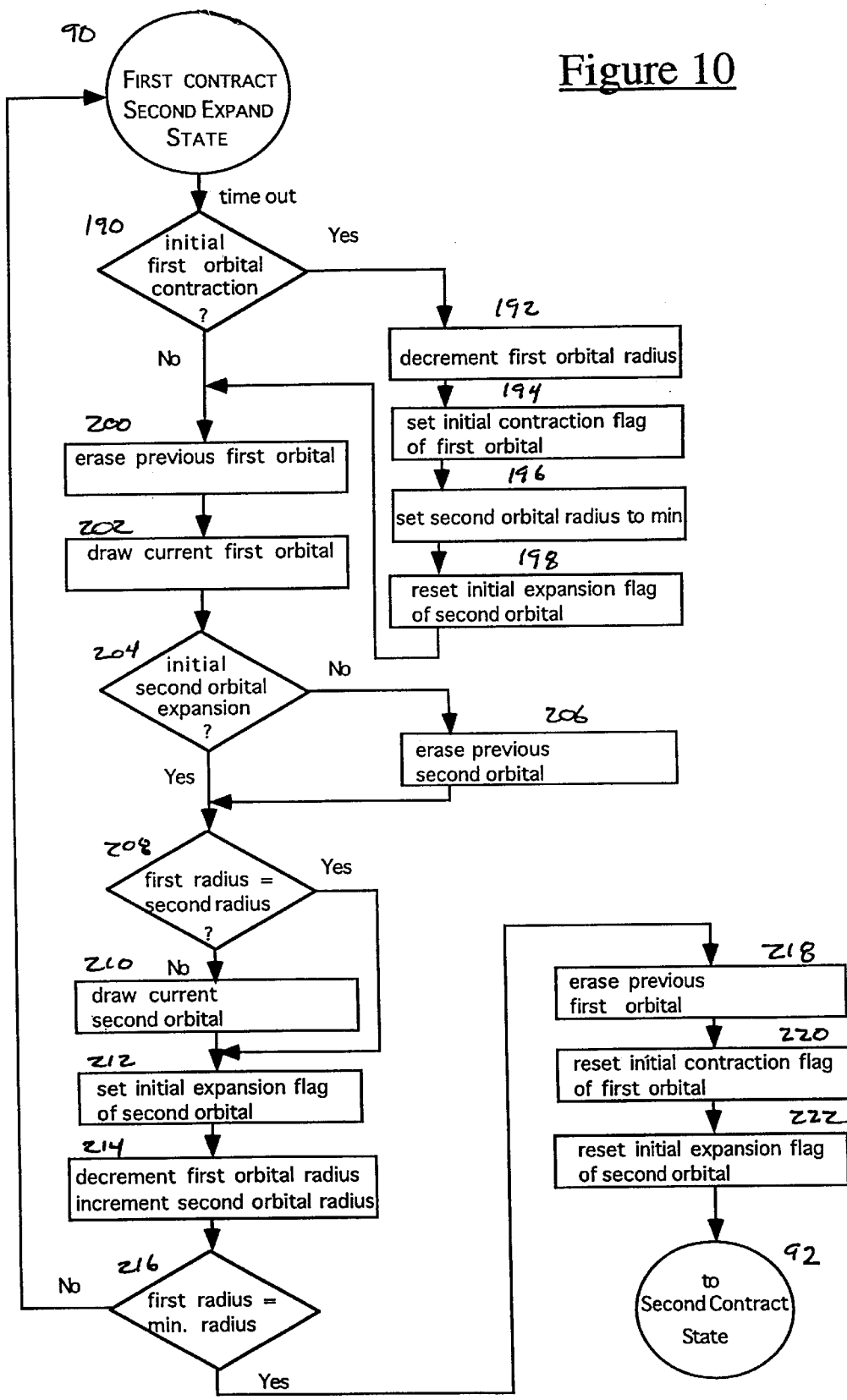
FIG. 10 is a logical flow diagram of the process implemented by the application program in the FIRST CONTRACT/ SECOND EXPAND state of FIG. 4 for indicating the existence of a control object in accordance with the preferred embodiment of the present invention.

As best shown by FIG. 10, the FIRST CONTRACT/SECOND EXPAND state 90 begins at decisional step 190, upon a time out of the timer. At decisional step 190 an initial contraction flag of the first orbital cluster of sparkles 70a is checked to determine if it is the initial contraction of the first orbital cluster of sparkles 70a. If it is not the initial contraction of the first orbital cluster of sparkles 70a, the NO branch of decisional step 190 leads to step 200.

If it is the initial contraction of the first orbital cluster of sparkles 70a, the YES branch of decisional step 190 leads to step 192 wherein the radius of the first orbital cluster of sparkles is decremented. Proceeding to step 194, the initial contraction flag of the first orbital cluster of sparkles 70a is set to signify that the next contraction of the first orbital cluster of sparkles 70a is not be in the initial contraction. At step 196, the radius of the second orbital cluster of sparkles is set to the minimum radius. In the preferred embodiment the minimum radius is one. Proceeding to step 198, an initial expansion flag of the second orbital cluster of sparkles 70b is reset. Step 198 leads to step 200.

At step 200, the previous first orbital cluster of sparkles 70a is erased. Next, at step 202, the current first orbital cluster of sparkles 70a is drawn. Step 202 leads to decisional step 204 wherein an initial expansion flag of the second orbital cluster of sparkles 70b is checked to determine if the current second orbital cluster of sparkles 70b is the initial second orbital cluster of sparkles. If the current second orbital cluster of sparkles 70b is the initial second orbital cluster of sparkles, then there is no previous second orbital cluster of sparkles 70b to be erased, and the YES branch of decisional step 204 leads to decisional step 208. If the current second orbital cluster of sparkles 70b is not the initial second orbital cluster of sparkles, the NO branch of decisional step 204 leads to step 206 wherein the previous second orbital cluster of sparkles 70b is erased. Step 206 also leads to decisional step 208.

At decisional step 208, it is determined if the radius of the first orbital cluster of sparkles 70a is the same as the radius of the second orbital cluster of sparkles 70b. If the radius of the first orbital cluster of sparkles 70a is different from the radius of the second orbital cluster of sparkles 70b, the NO branch of decisional step 208 leads to step 210 wherein the current second orbital cluster of sparkles 70b is drawn.

If the radius of the first orbital cluster of sparkles 70a is the same as the radius of the second orbital cluster of sparkles 70b, the orbitals would overlap if both were drawn. Consequently, the YES branch of decisional step 208 leads to step 212 thereby bypassing step 210 wherein the second orbital cluster of sparkles 70b would have been drawn. Thus, if the first orbital cluster of sparkles 70a and the second orbital cluster of sparkles 70b have the same radius, only the first orbital cluster of sparkles 70a will be drawn at that ring 72.

At step 212, the initial expansion flag of the second orbital cluster of sparkles 70b is set signifying that the next second orbital cluster of sparkles 70b is not the initial second orbital cluster of sparkles. Proceeding to step 214, the radius of the first orbital cluster of sparkles is decremented and the radius of the second orbital cluster of sparkles is incremented. Thus, the next first orbital cluster of sparkles 70a is drawn along the next smaller ring 72 and the next second orbital cluster of sparkles 70b is drawn along the next larger ring 72.

Next, at decisional step 216, it is determined if the radius of the first orbital cluster of sparkles is equal to the minimum radius. In the radius of the first orbital cluster of sparkles is not equal to the minimum radius, the first orbital cluster of sparkles is still contracting, and the NO branch of decisional step 216 returns to the FIRST CONTRACT/SECOND EXPAND state 90 to repeat the process. Thus, the process of the FIRST CONTRACT/SECOND EXPAND state 90 is repeated until the first orbital cluster of sparkles 70a has contracted to the smallest ring 72a.

If the radius of the first orbital cluster of sparkles is equal to the minimum radius, the first orbital cluster of sparkles 70a has finished contracting, and the YES branch of decisional step 216 leads to step 218. At step 218 the previous first orbital cluster of sparkles 70a is erased. Next, at step 220 the initial contraction flag of the first orbital cluster of sparkles 70a is reset. At step 222, the initial expansion flag of the second orbital cluster of sparkles 70b is reset. The process of the FIRST CONTRACT/SECOND EXPAND state 90 is ended at step 222 and the FIRST CONTRACT/SECOND EXPAND state 90 moves to the SECOND CONTRACT state 92.

Figure 11:
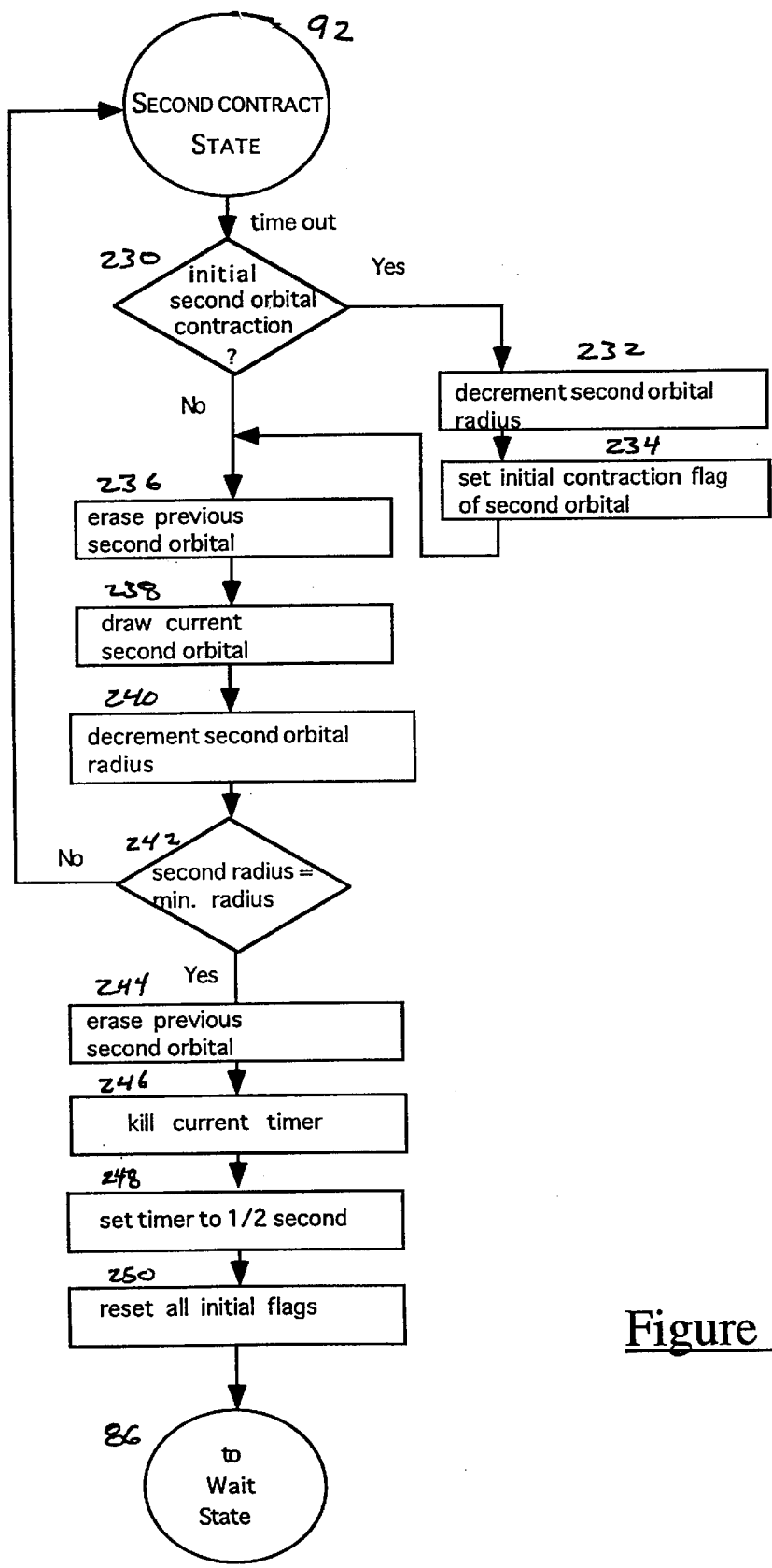
FIG. 11 is a logical flow diagram of the process implemented by the application program in the SECOND CONTRACT state of FIG. 4 for indicating the existence of a control object in accordance with the preferred embodiment of the present invention.

As best shown by FIG. 11, the SECOND CONTRACT state 92 begins at decisional step 230 upon time out of the timer. At decisional step 230, an initial contraction flag of the second orbital cluster of sparkles 70b is checked to determine if it is the initial contraction of the second orbital cluster of sparkles 70b. If it is not the initial contraction of the second orbital cluster of sparkles 70b, the NO branch of decisional step 230 leads to step 236.

If it is the initial contraction of the second orbital cluster of sparkles 70b, the YES branch of decisional step 230 leads to step 232. At step 232, the radius of the second orbital cluster of sparkles is decremented. Proceeding to step 234, the initial contraction flag of the second orbital cluster of sparkles 70b is set to signify that the next contraction of the second orbital cluster of sparkles 70b is not the initial contraction. Step 234 proceeds to step 236.

At step 236, the previous second orbital cluster of sparkles 70b is erased. Proceeding to step 238, the sparkles 60 of the current second orbital cluster of sparkles 70b are drawn. At step 240, the second orbital cluster of sparkles radius is decremented. Thus, the next second orbital cluster of sparkles 70b is drawn along the next smaller ring 72.

Step 240 leads to decisional step 242. At decisional step 242 it is determined if the radius of the second orbital cluster is equal to the minimum radius. If the radius of the second orbital cluster of sparkles is not equal to the minimum radius, the second orbital cluster of sparkles 70b has not finished contracting, and the NO branch returns to the SECOND CONTRACT state 92 to repeat the process. Thus, the process of the SECOND CONTRACT state 92 is repeated until the second orbital cluster of sparkles 70a has contracted to the smallest ring 72a.

If the radius of the second orbital cluster of sparkles 70b is equal to the minimum radius, the second orbital cluster of sparkles 70b has finished contracting, and the YES branch of decisional step 242 leads to step 244. At step 244, the previous second orbital cluster of sparkles 70b is erased.

Next, at step 246 the timer is killed. At step 248, a new timer is created and its interval set to one half second. Proceeding to step 250, all of the initial flags are reset to insure that they are properly set for the next cycle. The process of the SECOND CONTRACT state 92 is ended at step 250 and the SECOND CONTRACT state 92 returns to the WAIT state 86.

If the user causes a dialog box to be displayed during the method of the present invention, the method moves to the stop state 94. As best shown by FIG. 12, the process of the STOP state 94 begins at step 260 wherein the current timer is killed. Next at step 262, the first orbital cluster of sparkles 70*a* and the second orbital cluster of sparkles 70*b*, if displayed, are erased. Proceeding to step 264, all initial flags are reset so that they are properly set for restart.

Step 264 proceeds to the STOP state 94 wherein the process waits until the dialog box is closed by the user. Upon closure of the dialog box by the user, STOP state 94 proceeds to step 266 wherein a timer is created and its interval set to two seconds. The process of the STOP state 94 is ended at step 266 and the method returns to the WAIT state 86 for restart.

Thus, upon a page being displayed, the method and system of the present invention indicate a control object by displaying one or more images about the control object and changing the state of the images. In the preferred embodiment, the images are small sparkles that contrast in color with the surrounding area of the graphical user interface. The sparkles are three pixels by three pixels is size to prevent intrusion with viewing of the graphical user interface. The sparkles are changed in state by movement in a pair of orbital clusters of sparkles that expand and then contract in staggered order through a series of concentric rings around a focal point of the control object.

Those skilled in the art will understand that the various steps of the present invention include other error branches that cause the method to abort if an error condition such as a lack of free memory exists in the computer system 12. Such error branches are well known in the art and are not directly related to the present invention. Accordingly, they will not be further described.

From the foregoing description of the preferred embodiments and the several alternatives, other alternative constructions of the present invention may suggest themselves to those skilled in the art. Therefore, the scope of the present invention is to be limited only to the claims below and the equivalents thereof.

What is claimed is:

1. A method for identifying a plurality of control objects to a user, comprising the steps of:
    (a) determining a focal point for each of the control objects on a page;
    (b) selecting a focal point corresponding to a selected control object as a selected focal point;
    (c) identifying the selected control object by periodically displaying one or more images about the selected focal point;
    (d) repeating steps b and c with the remaining focal points corresponding to the remaining control objects.

2. The method of claim 1, wherein the control objects are successively identified until one of the control objects is manipulated or the control objects are no longer displayed.

3. The method of claim 2, wherein the control objects are successively identified in an order determined by ordinal numbers assigned to the control objects.

4. The method of claim 1, wherein the step of determining a focal point for each of the control objects comprises:
    for each control object, if the control object is regularly shaped, then determining that the focal point is a point at the center of the control object;
    otherwise, determining that the focal point is a random point inside the control object.

5. The method of claim 1, wherein the images displayed about the selected focal point are erased before selecting another focal point as the selected focal point.

6. The method of claim 1, wherein the images displayed about the selected focal point move along a series of rings centered around the selected focal point.

7. A computer-readable medium having computer-executable instructions to implement a method comprising the steps of:
    displaying a page on a display device using a graphical user interface;
    identifying a plurality of control objects for the page and a display order for the control objects;
    determining a focal point based upon the control object's shape for each of the control objects;
    repeating the steps of:
        selecting one of the control objects as a selected control object; and
        periodically displaying images about the focal point corresponding to the selected control object;
    until the page is no longer displayed or until one of the control objects is manipulated.

8. The computer-readable medium of claim 7, wherein the step of determining a focal point for each of the control objects comprises:
    for each of the control objects,
        determining a shape corresponding to the control object;
        if the shape is a regular shape, then determining that the focal point is a point at the center of the control object;
        otherwise, determining that the focal point is a random point inside the control object.

9. The computer-readable medium of claim 7, wherein each of the control objects is assigned an ordinal number, and wherein the control objects are selected in an order based upon the ordinal numbers.

10. The computer-readable medium of claim 7, wherein the images displayed about the focal point corresponding to the selected control object are erased before another one of the control objects is selected as the selected control object.

11. The computer readable medium of claim 7, wherein the step of determining a plurality of control objects for the page comprises searching a polytree associated with the page.

12. A computer-readable medium having computer-executable instructions to implement a method for identifying the location of a control object that is to be displayed in a user interface comprising the steps of:
    identifying the control object that is to be displayed in the user interface;
    identifying a boundary surrounding the control object, the boundary defining an area outside the control object and inside the boundary; and
    periodically displaying an image within the area until the control object is selected or until the control object is no longer displayed.

13. The computer-readable medium of claim 12, wherein the image is a different color than the control object.

14. The computer-readable medium of claim 12, wherein the image is a different color than the user interface.

15. The computer-readable medium of claim 12, wherein the image changes state by moving.

16. The computer-readable medium of claim 12, wherein the image is displayed in response to a cursor being moved in proximity to the control object.

* * * * *